United States Patent
Kawai

(10) Patent No.: US 8,084,920 B2
(45) Date of Patent: Dec. 27, 2011

(54) DRIVE APPARATUS AND IMAGE PICKUP APPARATUS

(75) Inventor: Sumio Kawai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 790 days.

(21) Appl. No.: 12/163,357

(22) Filed: Jun. 27, 2008

(65) Prior Publication Data

US 2009/0009657 A1    Jan. 8, 2009

(30) Foreign Application Priority Data

Jun. 28, 2007    (JP) .................................. 2007-170969

(51) Int. Cl.
*H01L 41/08* (2006.01)

(52) U.S. Cl. .............................. 310/323.02; 310/323.16

(58) Field of Classification Search ............... 310/323.02
See application file for complete search history.

(56) References Cited

U.S. PATENT DOCUMENTS

| | | | |
|---|---|---|---|
| 4,903,156 A | | 2/1990 | Hayashi et al. |
| 5,191,688 A | * | 3/1993 | Takizawa et al. ............ 29/25.35 |
| 5,696,421 A | * | 12/1997 | Zumeris et al. ............... 310/328 |
| 7,199,507 B2 | * | 4/2007 | Ganor et al. ................... 310/333 |
| 7,466,062 B2 | * | 12/2008 | Sakatani et al. .......... 310/323.16 |
| 7,884,528 B2 | * | 2/2011 | Sakano .................... 310/323.02 |
| 7,932,660 B2 | * | 4/2011 | Hamamoto et al. ...... 310/323.09 |
| 7,944,119 B2 | * | 5/2011 | Nagaoka ................... 310/323.02 |
| 7,973,822 B2 | * | 7/2011 | Kawai et al. ................ 348/208.7 |
| 2005/0259156 A1 | | 11/2005 | Kosaka et al. |
| 2006/0250048 A1 | * | 11/2006 | Moteki et al. ............ 310/323.02 |
| 2010/0066205 A1 | * | 3/2010 | Higashionji et al. ..... 310/323.02 |

FOREIGN PATENT DOCUMENTS

| | | |
|---|---|---|
| CN | 1013811 | 9/1991 |
| JP | 2006-081348 | 3/2006 |
| JP | 2007-058089 | 3/2007 |
| JP | 2007-065397 | 3/2007 |

* cited by examiner

*Primary Examiner* — Mark Budd
(74) *Attorney, Agent, or Firm* — Volpe and Koenig, P.C.

(57) ABSTRACT

An anti-vibration unit has: an X-axis transducer generating elliptical vibration in drivers; a frame which is a fixing member having a holding portion for holding the X-axis transducer; an X frame having fixed thereto a slide element to which the drivers of the X-axis transducer are pressed and which moves in the X-axis direction with respect to the frame; a Y-axis transducer held by a holding portion provided in the X-frame and generating elliptical vibration in drivers; and a Y frame having fixed thereto a slide element to which the drivers of the Y-axis transducer are pressed and which moves in the Y-axis direction with respect to the X frame. The X-axis transducer and the Y-axis transducer have substantially same resonant frequency, and the slide elements differ in at least one of rigidity and density thereof, thereby providing a drive apparatus down-sized, large in driving force and high in efficiency.

6 Claims, 15 Drawing Sheets

DRIVE APPARATUS AND IMAGE PICKUP APPARATUS

This application claims benefit of Japanese Application No. 2007-170969 filed in Japan on Jun. 28, 2007, the contents of which are incorporated by this reference.

BACKGROUND OF THE INVENTION

1. Field of the Invention

The present invention relates to a drive apparatus for driving a moving element to move the same in a predetermined direction using elliptical vibration of a transducer and to an image pickup apparatus such as a digital camera which performs shake compensation by the drive apparatus.

2. Description of the Related Art

A camera is a conventional example of an image pickup apparatus having shake compensation function. As shake compensation function which the camera has, there is known shake compensation function wherein: shaking in a pitch direction of the camera and shaking in a yaw direction of the camera are detected using shake detecting means such as an angular velocity sensor; and a portion of an image pickup optical system or an image pickup device is shifted respectively independently in a horizontal direction and a vertical direction in a plane perpendicular to a photographic optical axis in such directions as to compensate for shaking based on detected shake signals, thereby compensating for shakes of images on an image pickup surface of the image pickup device.

In a shake compensation mechanism achieving such shake compensation function, drive means is used which moves some of photographic lenses or the image pickup device itself in the horizontal direction and the vertical direction in a plane perpendicular to the photographic optical axis in order to compensate for shaking. The drive means is required to have high responsiveness in order to operate following shaking, precise drive (minute drive) and self-holding property to hold a position of a moving element when power is off.

For such requirements, a drive apparatus is conceivable as a shake compensation mechanism to which a transducer is applied, in which two transducers generating elliptical vibration in their surfaces and two moving elements pressed by the transducers are combined.

SUMMARY OF THE INVENTION

The present invention solves the above-described problems and has as its object provision of a drive apparatus which does not generate audible sound by unnecessary resonance, is small in size, has large driving force and is high in efficiency.

A drive apparatus according to the present invention has: a first transducer which generates elliptical vibration in a drive portion by application of predetermined frequency voltage thereto; a fixing member having a first holding portion for holding the first transducer; a first moving element having fixed thereto a first moving element portion to which the drive portion of the first transducer is pressed, the direction of movement of which is restricted to a first direction by a guiding portion of the fixing member, and which is driven by elliptical vibration of the first transducer to move in the first direction with respect to the fixing member; a second transducer which is held by a second holding portion provided in the first moving element and which generates elliptical vibration in a drive portion by application of predetermined frequency voltage thereto; and a second moving element having fixed thereto a second moving element portion to which the drive portion of the second transducer is pressed, the direction of movement of which is restricted to a second direction different from the first direction by a guiding portion of the first moving element, and which is driven by elliptical vibration of the second transducer to move in the second direction with respect to the first moving element; wherein the first transducer and the second transducer have substantially same resonant frequency and the first and second moving element portions differ in at least one of rigidity and density thereof.

Another drive apparatus of the present invention has: a first transducer which generates elliptical vibration in a drive portion by application of predetermined frequency voltage thereto; a fixing member having a first holding portion for holding the first transducer; a first moving element having fixed thereto a first moving element portion to which the drive portion of the first transducer is pressed, the direction of movement of which is restricted to a first direction by a guiding portion of the fixing member, and which is driven by elliptical vibration of the first transducer to move in the first direction with respect to the fixing member; a second transducer which is held by a second holding portion provided in the first moving element and which generates elliptical vibration in a drive portion by application of predetermined frequency voltage thereto; and a second moving element having fixed thereto a second moving element portion to which the drive portion of the second transducer is pressed, the direction of movement of which is restricted to a second direction different from the first direction by a guiding portion of the first moving element, and which is driven by elliptical vibration of the second transducer to move in the second direction with respect to the first moving element; wherein the first transducer and the second transducer have substantially same resonant frequency and the first moving element portion and the second moving element portion differ in their manner of fixation to the first moving element and the second moving element.

Even another drive apparatus of the present invention has: a first transducer which generates elliptical vibration in a drive portion by application of predetermined frequency voltage thereto; a fixing member having a first holding portion for holding the first transducer; a first moving element having fixed thereto a first moving element portion to which the drive portion of the first transducer is pressed, the direction of movement of which is restricted to a first direction by a guiding portion of the fixing member, and which is driven by elliptical vibration of the first transducer to move in the first direction with respect to the fixing member; a second transducer which is held by a second holding portion provided in the first moving element and which generates elliptical vibration in a drive portion by application of predetermined frequency voltage thereto; and a second moving element having fixed thereto a second moving element portion to which the drive portion of the second transducer is pressed, the direction of movement of which is restricted to a second direction different from the first direction by a guiding portion of the first moving element, and which is driven by elliptical vibration of the second transducer to move in the second direction with respect to the first moving element; wherein the first transducer and the second transducer have different resonant frequencies.

An image pickup apparatus of the present invention is an image pickup apparatus in which an image pickup device is displaced so as to compensate for shaking in a first direction and a second direction which directions are orthogonal in a plane perpendicular to the photographic optical axis, having: a first transducer which generates elliptical vibration in a drive portion by application of predetermined frequency voltage thereto; a fixing member having a first holding portion for holding the first transducer and fixed to the image pickup apparatus main body; a first moving element having fixed thereto a first moving element portion to which the drive portion of the first transducer is pressed, the direction of movement of which is restricted to the first direction by a guiding portion of the fixing member, and which is driven by elliptical vibration of the first transducer to move in the first direction with respect to the fixing member; a second transducer which is held by the first moving element having a second holding portion and which generates elliptical vibration in a drive portion by application of predetermined frequency voltage thereto; and a second moving element having fixed thereto a second moving element portion holding the image pickup device on the photographic optical axis to which the drive portion of the second transducer is pressed, the direction of movement of which is restricted to the second direction by a guiding portion of the first moving element, and which is driven by elliptical vibration of the second transducer to move in the second direction with respect to the first moving element; wherein the first moving element portion and the second moving element portion differ in at least one of rigidity and density.

A drive apparatus according to the present invention and an image pickup apparatus to which the drive apparatus is applied have characteristics of small size, large driving force and high efficiency. Other features and benefits of the present invention will become apparent by following explanation.

DETAILED DESCRIPTION OF THE PREFERRED EMBODIMENTS

Best modes for implementing a drive apparatus and an image pickup apparatus according to the present invention will be described below based on drawings.

The image pickup apparatus of each embodiment, being equipped with a drive apparatus for performing shake compensation of an image pickup unit including an image pickup device which obtains image signals by photoelectric conversion, will be described here as an example which is applied to a single lens reflex electronic camera (digital camera) with interchangeable lenses. The present invention is not limited to embodiments below and various variations are possible within a range not departing from a spirit of the present invention.

First, an exemplary system configuration of a camera which is the image pickup apparatus of a first embodiment of the present invention will be described with reference to FIG. 1.

Figure 1:
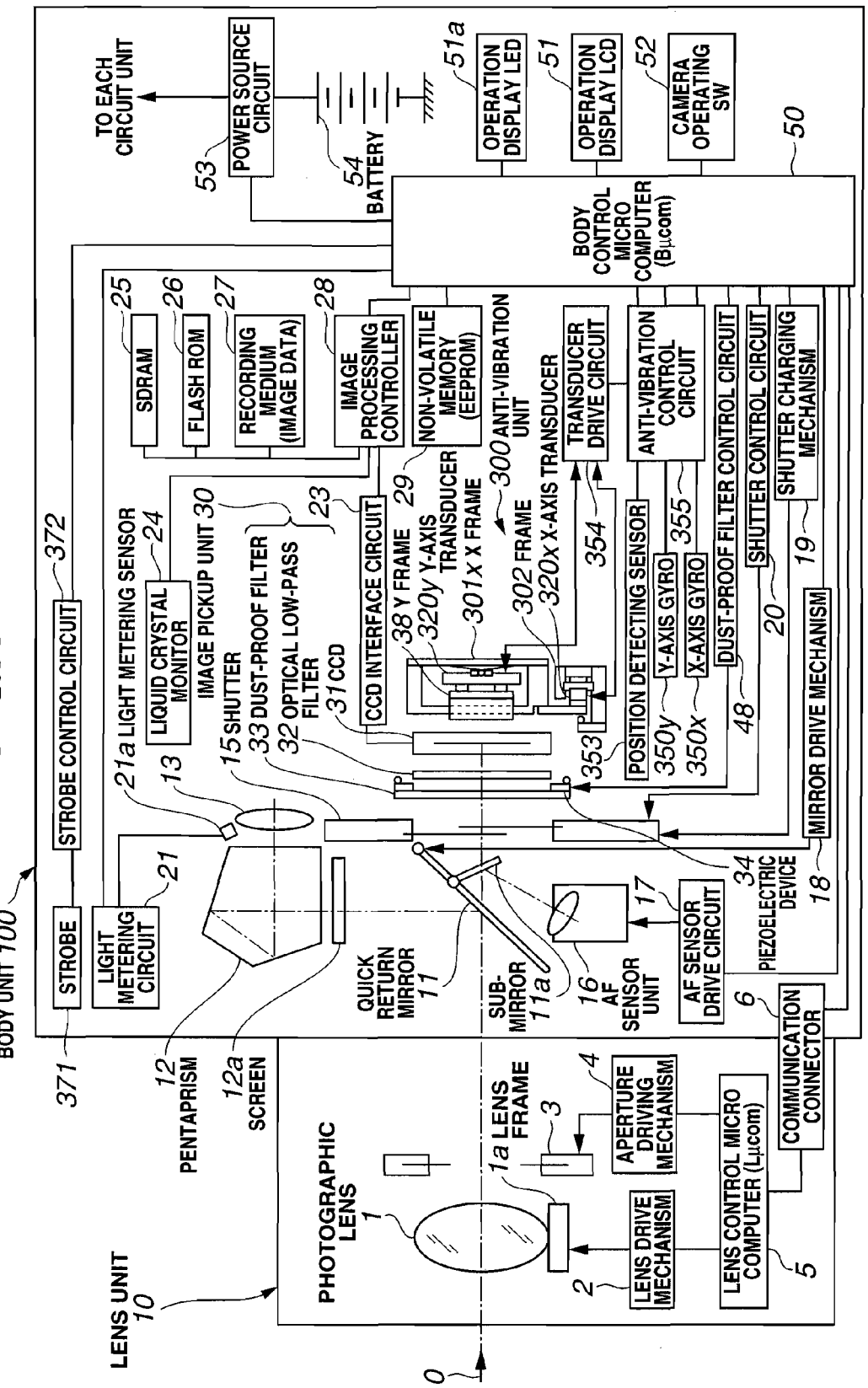
FIG. 1 is a block diagram schematically showing mainly an electrical system configuration of a camera of an embodiment of the present invention.

FIG. 1 is a block diagram schematically showing mainly an electrical system configuration of the camera of the present embodiment.

The camera of the present embodiment has a system configuration including a body unit 100 as a camera main body and a lens unit 10 as an interchangeable lens which is one of accessory apparatuses.

The lens unit 10 is detachably attached through an unshown lens mount provided in a front surface of the body unit 100. Control of the lens unit 10 is performed by a lens control micro computer (hereinafter referred to as Lµcom) 5 thereof. Control of the body unit 100 is performed by a body control micro computer (hereinafter referred to as Bµcom) 50.

The Lµcom 5 and Bµcom 50 are electrically connected so that they can communicate through a communication connector 6 in a state in which the lens unit 10 is attached to the body unit 100. They are configured as a camera system such that the Lµcom 5 operates while subsidiarily cooperating with the Bµcom 50.

The lens unit 10 has a photographic lens 1 and an aperture 3. The photographic lens 1 is driven by an unshown DC motor provided in a lens drive mechanism 2. The aperture 3 is driven by an unshown stepping motor provided in an aperture driving mechanism 4. The Lµcom 5 controls the motors based on instructions of Bµcom 50.

In the body unit 100, following component members are disposed as shown. For example, as an optical system, there are provided a component member of a single lens reflex type comprising a pentaprism 12, a quick return mirror 11, an eye lens 13 and a sub-mirror 11a; a shutter 15 of a focal plane type on a photographic optical axis; and an AF sensor unit 16 for receiving light flux reflected from the sub-mirror 11a to detect defocus amounts.

Further in the body unit 100, there are provided an AF sensor drive circuit 17 for driving and controlling the AF sensor unit 16; a mirror drive mechanism 18 for driving and controlling the quick return mirror 11; a shutter charging mechanism 19 for charging springs which drive a front curtain and a rear curtain of the shutter 15; a shutter control circuit 20 for controlling movements of the front curtain and rear curtain; and a light metering circuit 21 for performing a light metering process based on a light metering sensor 21a which detects light flux from the pentaprism 12. In addition, a strobe 371 is provided light emission of which is controlled by a strobe control circuit 372.

Further, an image pickup unit 30 for photoelectric conversion of subject images having passed through the above-described optical system is provided on the photographic optical axis. The image pickup unit 30 is made up by integrating a CCD 31 which is an image pickup device, an optical low-pass filter (LPF) 32 disposed in front of the CCD 31 and a dust-proof filter 33 as a unit. A piezoelectric device 34 is mounted in a peripheral edge portion of the dust-proof filter 33.

The piezoelectric device 34 has two electrodes and is configured such that dust adhering to a surface of the filter can be removed by causing vibration of the dust-proof filter 33 by causing vibration of the piezoelectric device 34 at a predetermined frequency by means of a dust-proof filter control circuit 48. A later-described anti-vibration unit (drive apparatus) 300 for shake compensation is added to the image pickup unit 30.

The camera system of the present embodiment is configured so as to provide electronic record and display function as well as electronic image pickup function, having a CCD interface circuit 23 connected to the CCD 31, a liquid crystal monitor 24 and an image processing controller 28 which processes images using an SDRAM 25 and a FLASH ROM 26 functioning as storage areas and the like.

Here, a recording medium 27, which is an external recording medium such as various memory cards and external HDDs, is interchangeably attached so as to communicate with the camera main body through a communication connector. Image data obtained by photography are recorded in the recording medium 27. As another storage area, a non-volatile memory 29 comprised of an EEPROM, for example, for storing predetermined control parameters necessary for control of the camera is provided so as to be accessible from the Bµcom 50.

The Bµcom 50 is provided with an operation display LCD 51 and an operation display LED 51a for noticing a user of operating states of the camera by means of display output as well as a group of camera operating switches (hereinafter, "switch" is written as "SW") 52. The group of camera operating SW 52 is a group of switches including operating buttons necessary for operating the camera, such as a release SW, a mode change SW and a power SW.

Further, there are provided a battery 54 as a power source and a power source circuit 53 for converting voltage of the battery 54 to voltage required by each of circuit units constituting the camera system to supply it. A voltage detection circuit is also provided which detects voltage variations at a time when currents are supplied from an external power source through a jack.

Respective parts of the camera system configured as described above operate generally as described below.

First, the image processing controller 28, following instructions of the Bµcom 50, controls the CCD interface circuit 23 and takes in image data from the CCD 31. The image data are converted into video signals by the image processing controller 28 and outputted and displayed on the liquid crystal monitor 24. A user can check a photographed image by means of an image displayed on the liquid crystal monitor 24.

The SDRAM 25 is a memory for temporary storage of image data and is used for a work area at a time of conversion of image data and the like. In addition, image data are stored in the recording medium 27 after converted into JPEG data.

The mirror drive mechanism 18 is a mechanism for driving the quick return mirror 11 to an up position and a down position. When the quick return mirror 11 is in the down position, light flux from the photographic lens 1 is divided into sides of the AF sensor unit 16 and the pentaprism 12 to be guided. Output from an AF sensor in the AF sensor unit 16 is sent to the Bµcom 50 through the AF sensor drive circuit 17 and a known distance measuring process is performed. Meanwhile, a portion of light flux having passed through the pentaprism 12 is guided to the light metering sensor 21a in the light metering circuit 21, where a known light metering process is performed based on a detected light amount.

Figure 2:
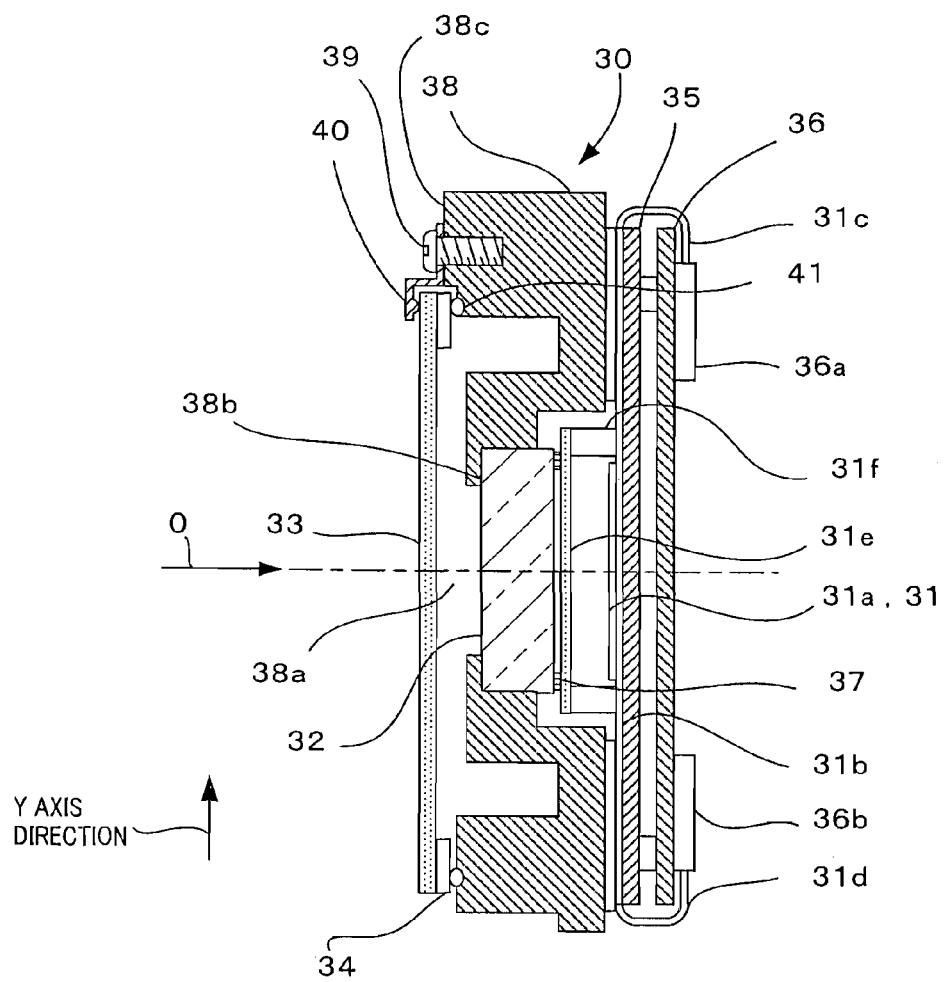
FIG. 2 is a vertical sectional side view showing a configuration of an image pickup unit contained in the camera of FIG. 1.

Next, the image pickup unit 30 including the CCD 31 will be described with reference to FIG. 2. FIG. 2 is a vertical sectional side view showing a configuration of the image pickup unit 30.

The image pickup unit 30 has: the CCD 31 as an image pickup device which obtains image signals corresponding to light transmitted through the photographic optical system and radiated on its photoelectric conversion surface; the optical low-pass filter (LPF) 32 which is disposed in the photoelectric conversion surface side of the CCD 31 and which removes high frequency components from light flux of a subject transmitted through the photographic optical system and radiated; the dust-proof filter 33 arranged in a front surface side of the optical LPF 32 facing thereto with a predetermined space; and the piezoelectric device 34 for giving predetermined vibration to the dust-proof filter 33, disposed in a peripheral edge portion of the dust-proof filter 33.

Here, a CCD chip 31a of the CCD 31 is directly mounted on a flexible board 31b disposed on a fixed plate 35, and connecting portions 31c, 31d extending from both ends of the flexible board 31b are connected with a main circuit board 36 side through connectors 36a, 36b provided on the main circuit board 36. In addition, the CCD 31 has a protective glass 31e which is fixed on the flexible board 31b through a spacer 31f.

Further, a filter receiving member 37 composed of a resilient member or the like is disposed between the CCD 31 and the optical LPF 32. The filter receiving member 37 is disposed at a position in a front surface side peripheral edge portion of the CCD 31 avoiding an effective area of the photoelectric conversion surface, and abuts a vicinity of a rear surface side peripheral edge portion of the optical LPF 32. Thereby it is configured such that substantial airtightness is maintained between the CCD 31 and the optical LPF 32. Further, a Y frame 38 is disposed which is a holder airtightly covering the CCD 31 and the optical LPF 32.

The Y frame (holder) 38 has a rectangular opening 38a substantially in a middle portion around the photographic optical axis. A step portion 38b of a substantially L-shaped section is formed in an inner peripheral edge portion of the opening 38a in the dust-proof filter 33 side. The optical LPF 32 and the CCD 31 are disposed against the opening 38a from a rear side thereof.

Here, by making an arrangement such that a front surface side peripheral edge portion of the optical LPF 32 is brought into substantially airtight contact with the step portion 38b, the optical LPF 32 is restricted in its position in the photographic optical axis direction and is prevented from getting out of an interior of the Y frame (holder) 38 toward a front surface side by means of the step portion 38b.

Meanwhile, a dust-proof filter receiving portion 38c is formed in a peripheral edge portion in a front surface side of the Y frame (holder) 38 over its entire periphery, protruding into a front surface side beyond the step portion 38b around the step portion 38b, for holding the dust-proof filter 33 in front of the optical LPF 32 with a predetermined space. The dust-proof filter 33, formed in a form of a circular or polygonal plate as a whole, is supported by the dust-proof filter receiving portion 38c in a state of being pressed by a pressing member 40 formed of a resilient element such as a leaf spring and fixed to the dust-proof filter receiving portion 38c by a screw 39.

Here, an annular seal 41 is interposed between the dust-proof filter receiving portion 38c and the piezoelectric device 34 portion which is disposed in an outer peripheral edge portion in a rear surface side of the dust-proof filter 33, thereby securing airtightness. The image pickup unit 30 is thus configured as an airtight structure having the Y frame (holder) 38 formed in a desired size to which the CCD 31 is mounted.

Next, shake compensation function of the camera of the present embodiment will be described.

In the present embodiment, the CCD 31 which is an image pickup device is displaced so as to compensate for shaking in an X-axis direction which is a first direction and a Y-axis direction which is a second direction, the directions being orthogonal in an XY plane perpendicular to the photographic optical axis, wherein the direction of the photographic optical axis is a Z-axis direction. The anti-vibration unit including a drive apparatus for shake compensation is configured using, as a drive source, a transducer which generates elliptical vibration in a drive portion by application of a predetermined frequency voltage thereto, and having, as an object to be moved, the Y frame (holder) 38 to which the CCD 31 in the image pickup unit 30 is mounted.

First, an operating principle of the transducer used as the drive source in the drive apparatus of the present embodiment will be described with reference to FIGS. 3A to 3D and FIG. 4. FIGS. 3A to 3D are schematic diagrams showing the operating principle of the transducer. FIG. 4 is a perspective view of the above transducer and a moving element which is an element to be driven.

Figure 3A:
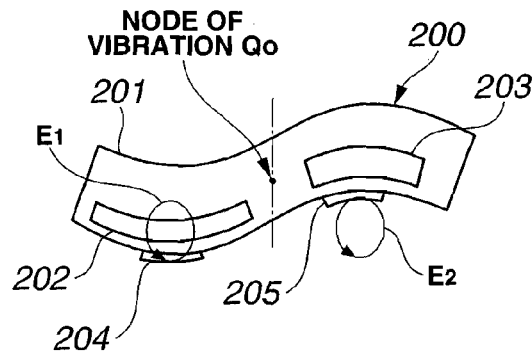
FIG. 3A is a schematic diagram showing an operating principle of a transducer applied to an anti-vibration unit of the camera of FIG. 1, showing a flexural state among vibration states of the transducer.
Figure 4:
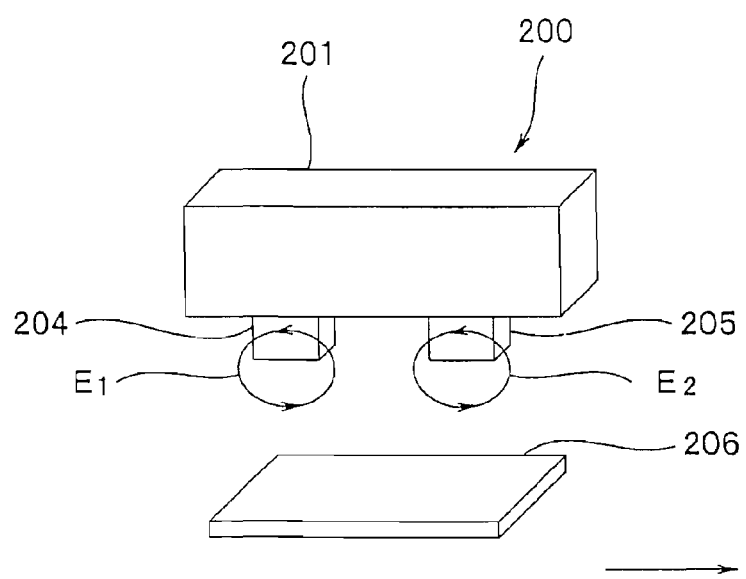
FIG. 4 is a perspective view of the transducer of FIG. 3 and a moving element which is an element to be driven.

A transducer 200 shown in FIG. 3A and the like has a piezoelectric element 201 formed in a rectangular shape in a predetermined size, a pair of drive electrodes 202, 203 centrosymmetrically formed near one side of the piezoelectric element 201 and drivers 204, 205 as the drive portion provided in positions on a surface of the piezoelectric element 201 corresponding to the drive electrodes 202, 203.

When positive voltage is applied to the drive electrode 202, the drive electrode 202 portion is deformed so as to be stretched while the piezoelectric element 201 portion on its rear surface side is not deformed so as to be stretched, thereby they being deformed in an arc shape as a whole, as shown in FIG. 3A. On the contrary, when negative voltage is applied to the drive electrode 202, the drive electrode 202 portion is deformed so as to shrink while the piezoelectric element 201 portion on its rear surface side does not shrink, thereby they being deformed in an arc shape reverse to that of FIG. 3A as a whole, as shown in FIG. 3C.

The same is true for the drive electrode 203 side.

Therefore, to generate elliptical vibrations E1, E2 in surfaces of the drivers 204, 205, a frequency voltage of a sine wave at a predetermined frequency is applied to one drive electrode 202 of the piezoelectric element 201 polarized, while to the other drive electrode 203 is applied a frequency voltage of a sine wave at the same frequency as that of the frequency voltage applied to the drive electrode 202 with a shifted phase. The frequency of the frequency voltage to be applied is set at such a predetermined value that the middle of the piezoelectric element 201 is the node $Q_0$ of the flexural vibration and the drivers 204, 205 portions are the antinodes of the flexural vibration, wherein the node of longitudinal vibration (vibration of a rectangular parallelepiped to stretch and shrink in the longitudinal direction, see FIG. 3D) of the piezoelectric element 201 coincides with the node of the flexural vibration.

Figure 3B:
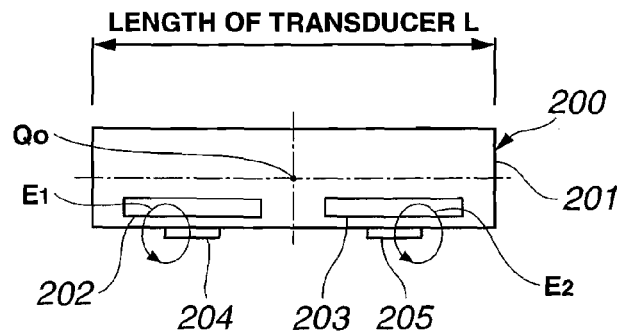
FIG. 3B is also a schematic diagram showing an operating principle of a transducer applied to an anti-vibration unit of the camera of FIG. 1, showing a stretching and shrinking state among vibration states of the transducer.
Figure 3C:
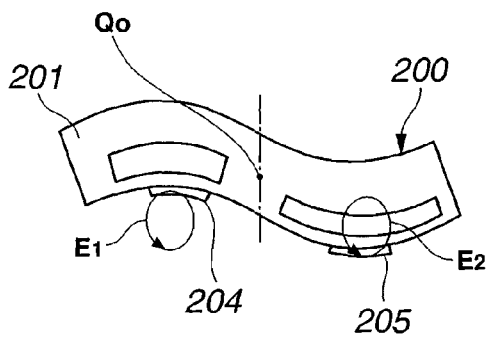
FIG. 3C is also a schematic diagram showing an operating principle of a transducer applied to an anti-vibration unit of the camera of FIG. 1, showing a flexural state of vibration of the transducer.
Figure 3D:
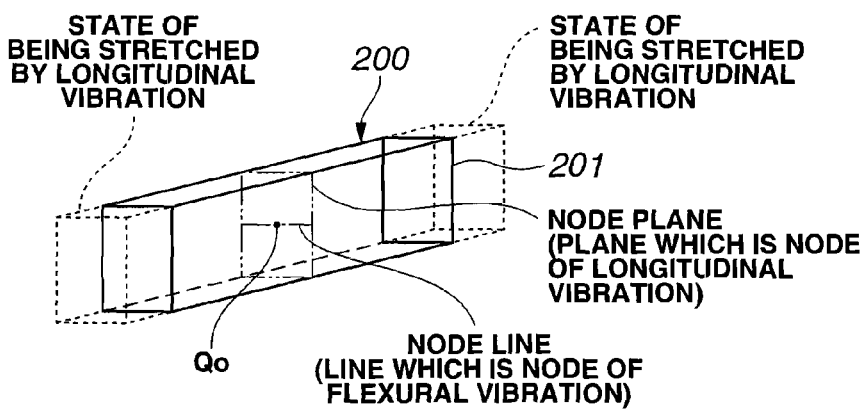
FIG. 3D is a schematic diagram showing an operating principle of a transducer applied to an anti-vibration unit of the camera of FIG. 1, showing a perspective view in a stretched state at a time of vibration of the transducer.

With positive and negative variations of the frequency voltage applied in the above set state, the transducer 200 repeatedly generates flexural vibration as shown in FIGS. 3A to 3C including the state shown in FIG. 3B and elliptical vibration is generated in the surfaces of the drivers 204, 205. By disposing a moving element 206 to be driven shown in FIG. 4 in pressure contact with the drivers 204, 205 side of the transducer 200, the moving element 206 is moved in accordance with directions of the elliptical vibrations E1, E2 generated in the surfaces of the drivers 204, 205.

At this time, by changing the phase difference between the frequency voltages applied to the drive electrodes 202, 203, shapes of the elliptical vibrations E1, E2 generated in the surfaces of the drivers 204, 205 can be changed, thereby changing the speed of movement of the moving element 206 which is driven by the transducer 200 to move.

For example, when the phase difference between the frequency voltages is 0°, the speed is 0; as the phase difference increases, the speed gradually increases; a maximum speed is reached at the phase difference of 90°; when the phase difference increases beyond 90°, on the contrary the speed gradually decreases; the speed becomes 0 again at the phase difference of 180°. At a phase difference of a negative value, the elliptical vibrations E1, E2 generated in the drivers 204, 205 rotate in the reverse directions, thereby enabling driving of the moving element in the reverse direction. In this case, a maximum speed is reached at the phase difference of −90°.

The anti-vibration unit of the present embodiment using the above-described transducer as a drive source will be described with reference to FIGS. 5 to 10.

Figure 5:
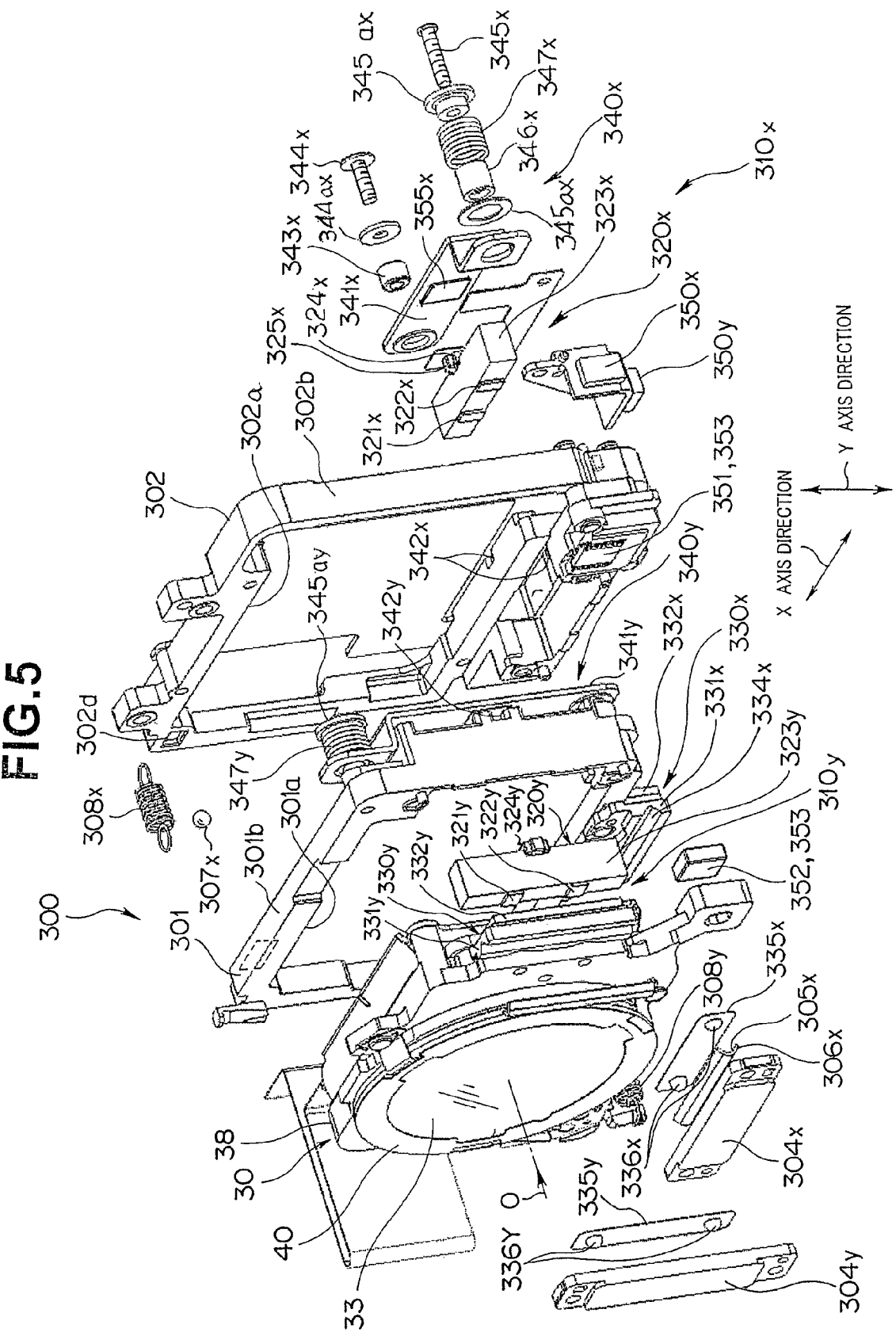
FIG. 5 is an exploded perspective view showing a configuration of an anti-vibration unit contained in the camera of FIG. 1.
Figure 6:
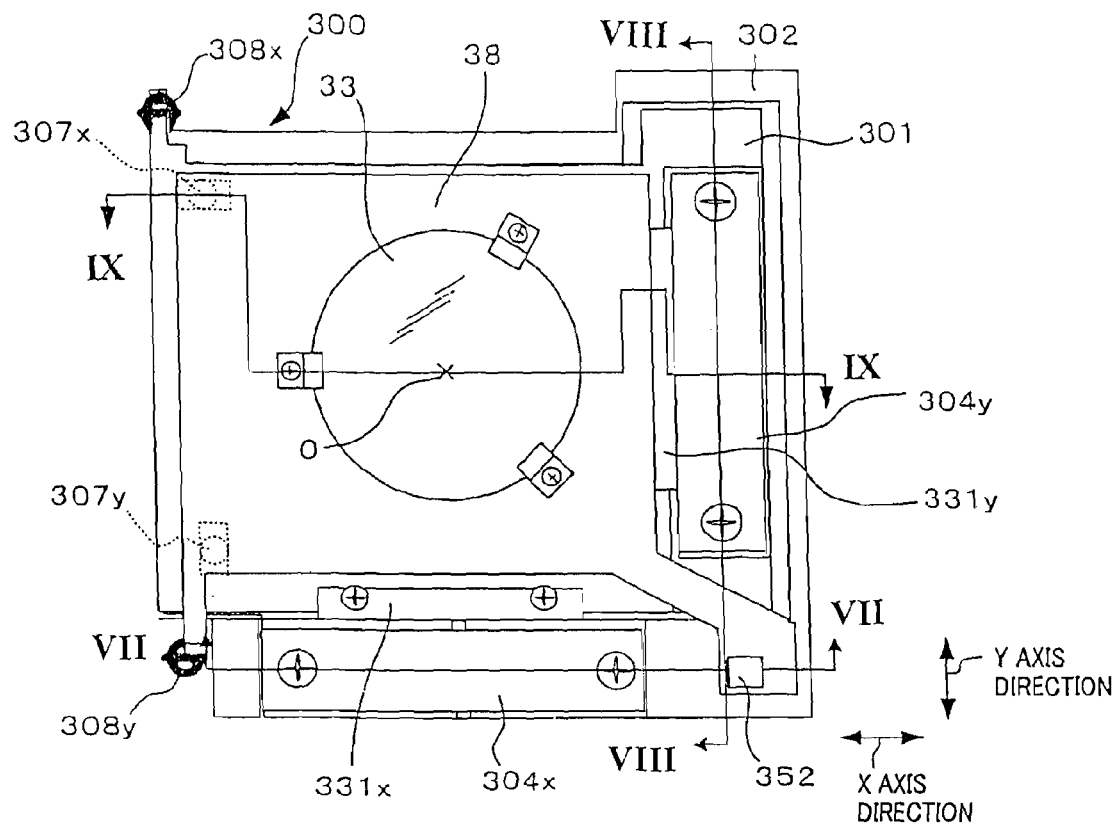
FIG. 6 is a schematic view of an arrangement of the anti-vibration unit of FIG. 5 from a front side of the photographic optical axis, showing shapes of components of the anti-vibration unit simplified.
Figure 7:
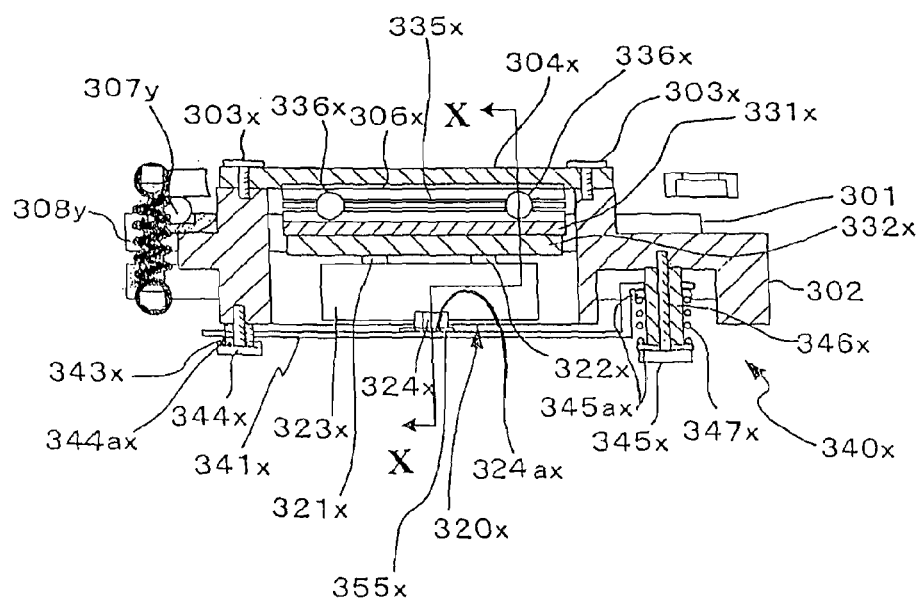
FIG. 7 is a sectional view along VII-VII of FIG. 6.
Figure 8:
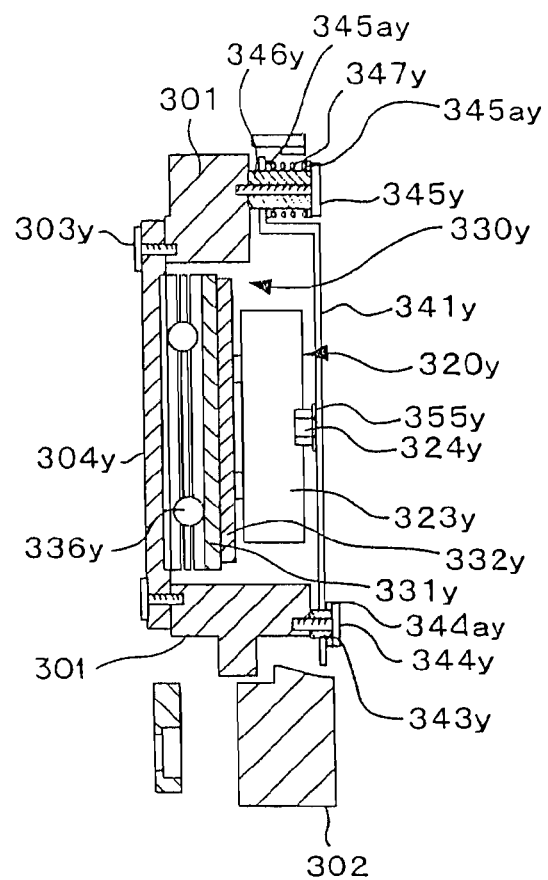
FIG. 8 is a sectional view along VIII-VIII of FIG. 6.
Figure 9:
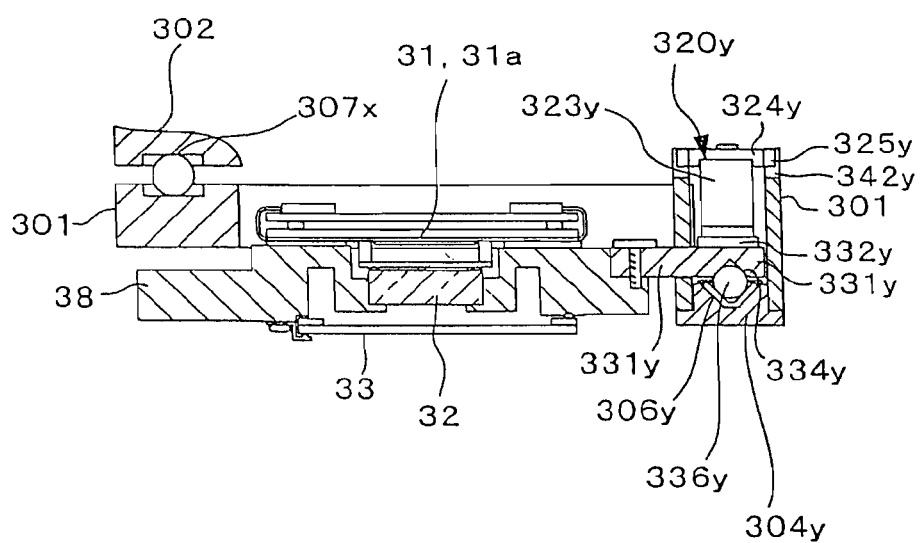
FIG. 9 is a sectional view along IX-IX of FIG. 6.
Figure 10:
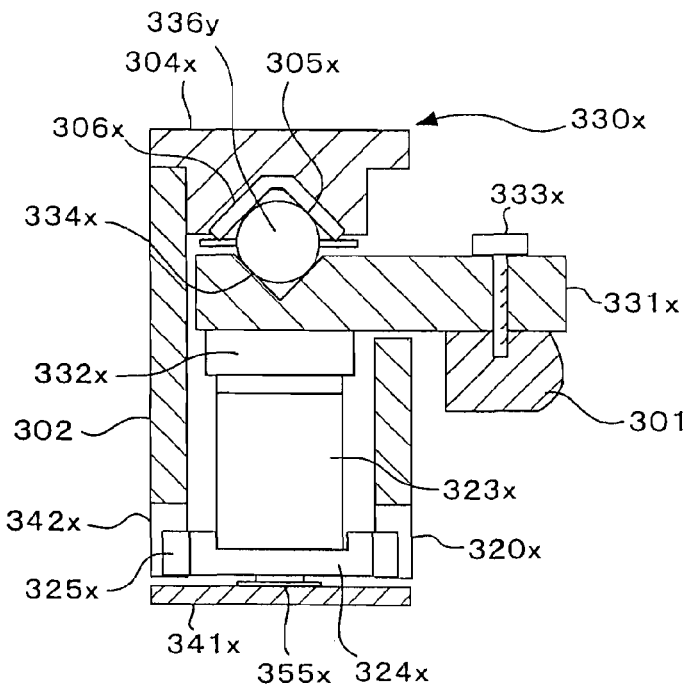
FIG. 10 is a sectional view along X-X of FIG. 7.

FIG. 5 is an exploded perspective view showing a configuration of the anti-vibration unit of the present embodiment. FIG. 6 is a view schematically showing the arrangement of the anti-vibration unit of FIG. 5 as viewed from the front side of the photographic optical axis, shapes of components of the anti-vibration unit being simplified. FIG. 7 is a view in section taken along VII-VII of FIG. 6. FIG. 8 is a view in section taken along VIII-VIII of FIG. 6. FIG. 9 is a view in section taken along IX-IX of FIG. 6. FIG. 10 is a view in section taken along X-X of FIG. 7.

First, the anti-vibration unit 300 of the present embodiment has the Y frame (a second moving element) 38 which is a holder to which the CCD 31 as well as the optical LPF 32, the dust-proof filter 33 and the like is mounted as a final moving object to be moved in the X-axis direction (the first direction) and the Y-axis direction (the second direction), the unit having: an X frame (a first moving element, a fixing member for the Y frame) 301 which is of a shape of a frame having a frame portion 301b surrounding an opening 301a around the photographic optical axis and which is formed in a desired size so as to have the Y frame 38 mounted so as to be movable in the Y-axis direction; and a frame (a fixing member) 302 which is of a shape of a frame having a frame portion 302b surrounding an opening 302a around the photographic optical axis, which is formed in a desired size so as to have the X frame 301 mounted so as to be movable in the X-axis direction, and which is fixed to the camera main body not shown.

The X-axis direction and the Y-axis direction are perpendicular to each other and perpendicularly intersecting the photographic optical axis (represented by O in the figures).

An X-axis drive mechanism portion 310x for displacing the X frame 301 with respect to the frame 302 in the X-axis direction and a Y-axis drive mechanism portion 310y for displacing the Y frame 38 with respect to the X frame 301 in the Y-axis direction are provided. The Y frame 38 is displaced together with the X frame 301 with respect to the frame 302 in the X-axis direction as well as is displaced with respect to the X frame 301 in the Y-axis direction. Thereby, the CCD 31 mounted to the Y frame 38 is displaced so as to compensate for shaking in the X-axis direction and the Y-axis direction in the XY plane.

Now a configuration of the X-axis drive mechanism portion 310x will be described. The X-axis drive mechanism portion 310x has an X axis transducer (a first transducer) 320x, a slide element (a first moving element portion) 330x integrally fixed to the X frame 301 and driven together with the X frame 301, and a pressing mechanism (biasing mechanism) 340x for biasing the X-axis transducer 320x to the slide element 330x side.

The X-axis transducer 320x has on one side of a rectangular piezoelectric element 323x drivers (drive portion) 321x, 322x which generate elliptical vibration by application of predetermined frequency voltage according to the operating principle of the transducer 200 explained in the above FIGS. 3, 4. Further, the X-axis transducer 320x has a transducer holder 324x in a middle position of a side of the piezoelectric element 323x opposite to the drivers 321x, 322x. A protrusion 325x formed on the transducer holder 324x fits to a groove form holding portion 342x (a first holding portion) of the frame 302 to position and hold the X-axis transducer 320x, restricting its movement in the X-axis direction. By such a configuration, driving force of the elliptical vibration generated in the drivers 321x, 322x acts in the X-axis direction.

The slide element 330x is made up by fixing a slide plate (slide portion) 332x on a bearing (guided portion) 331x. The bearing 331x is integrally fixed by, for example, a screw 333x to a portion of the X frame 301 in such a position that the drivers 321x, 322x of the X-axis transducer 320x are pressed to contact the slide plate 332x. Fixation of the slide element 330x to the X frame 301 is not limited to that by a screw but may also be bonding or the like; the manner of fixation is not particularly restricted.

Here, as compared with the X frame 301 formed in a desired size, the slide element 330x is formed in a small size, that is, a size corresponding to the X-axis transducer 320x, as can be seen from FIG. 5. In addition, while the X frame 301 is formed of a resin material, aluminum or the like of low rigidity, the slide plate 332x is formed of a material of abrasion resistance and high rigidity such as ceramics and the bearing 331x is made by quenching a material which can be quenched such as ferritic stainless steel to improve its rigidity.

Further, the frame 302 has a bearing (guiding portion) 304x which is arranged at a mounting portion in a shape of an opening formed in the frame 302 and which is fixed by a screw 303x so as to face the bearing 331x of the slide element 330x. To the bearing 304x is fixed a V-grooved plate 306x for preventing abrasion, in which a V-groove 305x is formed along the X-axis direction, as shown in FIGS. 7, 10.

A V-groove 334x facing the V-groove 305x of the V-grooved plate 306x on the bearing 304x side is formed in the bearing 331x, as shown in FIGS. 7, 10. Here, the bearings 304x, 331x have two balls 336x (rolling elements) positioned by a retainer 335x sandwiched between the V-grooves 305x, 334x and thereby have a structure having the two balls 336x arrayed in a line along the X-axis direction.

The two balls 336x are positioned in the vicinity of positions slightly outside in the X-axis direction from the positions immediately under the drivers 321x, 322x, as shown in FIG. 7 and the like, being restricted by the retainer 335x in their movement in the X-axis direction. The above rolling elements are not limited to balls and rollers may also be applied.

The pressing mechanism 340x has: a press plate 341x fixed at one end to the frame 302 by a screw 344x through a washer 344ax and a spacer 343x and holding the X-axis transducer 320x; and a pressure spring 347x disposed sandwiching a washer 345ax and a spacer 346x around a screw 345x which fixes the other end of the press plate 341x to the frame 302 and biasing the press plate 341x.

The drivers 321x, 322x of the X-axis transducer 320x are pressed into contact with the slide plate 332x with predetermined force through the press plate 341x by means of biasing force of the pressure spring 347x.

The pressing force of the pressing mechanism 340x is set at a very strong force on the order of 15N (Newton). The press plate 341x has a rubber sheet 355x applied to its transducer side surface and presses the transducer holder 324x of the X-axis transducer 320 through the rubber sheet 355x.

The bearing 331x is rotatable about an axis passing through the centers of the balls 336x and parallel to the V-groove 334x. However, the bearing 331x being integrated with the X frame 301, a ball (rolling element) 307x is disposed between the frame 302 and the X frame 301 in a position remote from the bearing 331x in a direction different from the X-axis direction, specifically, a substantially diagonal position which is most remote on the frame portion 302b (FIG. 9).

The ball 307x is maintained in a sandwiched state in a groove 302d by biasing force of a spring 308x engaged between the frame 302 and the X frame 301 in a vicinity of the ball 307x (FIG. 6), and is positioned so as to maintain a space in the photographic optical axis (Z-axis) direction of the X frame 301 with the frame 302.

Here, the biasing force of the spring 308x only needs to maintain the sandwiched state of the ball 307x, and is set to be significantly weaker than the biasing force of the pressure spring 347x. Thus, the X frame (moving element) 301 to which the slide element (moving element portion) 330x is integrally mounted is configured so as to move in three-point support by the two balls 336x and the one ball 307x with respect to the frame 302.

In addition, since the ball 307x is disposed opposite from the balls 336x across the photographic optical axis and the opening 301a, a stable three-point support structure can be adopted by arranging the ball 307x and the balls 336x with long distance therebetween. In this way, according to the present embodiment, the X frame (moving element) 301 can be guided in its direction of movement as well as can be restricted in its tilting so that stable driving is enabled.

Meanwhile, the Y-axis drive mechanism portion 310y has a basic structure similar to that of the X-axis drive mechanism portion 310x, having the X frame 301 instead of the frame 302 as a fixing member and the Y frame 38 (second moving element) instead of the X frame 301 as an object to be moved, and provided with a Y-axis transducer (second transducer) 320y, a slide element (second moving element portion) 330y integrally fixed to the Y frame 38 to be an object to be driven together with the Y frame 38, and a pressing mechanism (biasing mechanism) 340y for biasing the Y-axis transducer 320y to the slide element 330y side.

With respect to components of the Y-axis drive mechanism portion 310y, portions identical or corresponding to those of the X-axis drive mechanism portion 310x are represented by the same reference numerals with suffixes "y", and only portions different from those of the X-axis drive mechanism portion 310x will be described.

The Y-axis drive mechanism portion 310y differs from the X-axis drive mechanism portion 310x in thickness of respective slide plates 332x, 332y (made of a same material with same density). Here, the configuration is such that thickness of a plate of the X-axis drive mechanism portion 310x is greater than that of the Y-axis drive mechanism portion 310y. Therefore, rigidity of the slide plate 332x against flexure (that is, flexure corresponding to flexural vibration of the transducer) increasing in proportion to the third power of thickness, the rigidity of the slide element 330y configured by fixing the slide plate 332y is less than that of the slide element 330x.

Here, the slide plate 332x of the X-axis drive mechanism portion 310x is made thick in order to increase its rigidity to reduce loss of vibration energy due to flexure by application of vibration to the slide plate 332x; the X frame 301 driven by the X-axis drive mechanism portion 310x also holds the Y-axis drive mechanism portion 310y and needs to generate greater driving force; therefore, the X-axis transducer 320x has greater amplitude of vibration.

In addition, by increasing thickness of the slide plate 332x, rigidity of the slide element 330x can be increased; by raising a fundamental frequency of flexure of the slide element 330x, setting can be made such that the slide element 330x does not overlap drive frequency of the X-axis transducer; loss of vibration energy due to resonance of the slide element 330x can also be restrained.

Besides making thicknesses of the slide elements 330x and 330y including the slide plates 332x, 332y different, fundamental frequency of flexure of the slide element 330x side can be made high to obtain similar effect by making moduli of elasticity or rigidities of component materials different (for example, making different second moments of area with respect to neutral axes of the slide plates) or by applying materials of different densities.

Further, the anti-vibration unit 300 of the present embodiment is provided in the main body portion of the body unit 100 with an X-axis gyro 350x which is a sensor for detecting shaking of the body unit 100 about the X-axis (shaking in the pitch direction) and a Y-axis gyro 350y which is a sensor for detecting shaking of the body unit 100 about the Y-axis (shaking in the yaw direction).

In addition, a position detecting sensor 353 is provided which comprises a Hall element 351 disposed in the frame 302 and a magnet 352 disposed in a portion of the Y frame 38 so as to face the Hall element 351. Further, an anti-vibration control circuit 355 is provided which controls a transducer drive circuit 354 for the X-axis transducer 320x, Y-axis transducer 320y based on signals from the X-axis gyro 350x, Y-axis gyro 350y and position detecting sensor 353. The anti-vibration control circuit 355 performs control operation in accordance with instructions from the Bμcom 50.

Next, operation of the X-axis drive mechanism 310x will be described with reference to FIGS. 11 to 15 and FIGS. 16A to 16H.

Figure 11:
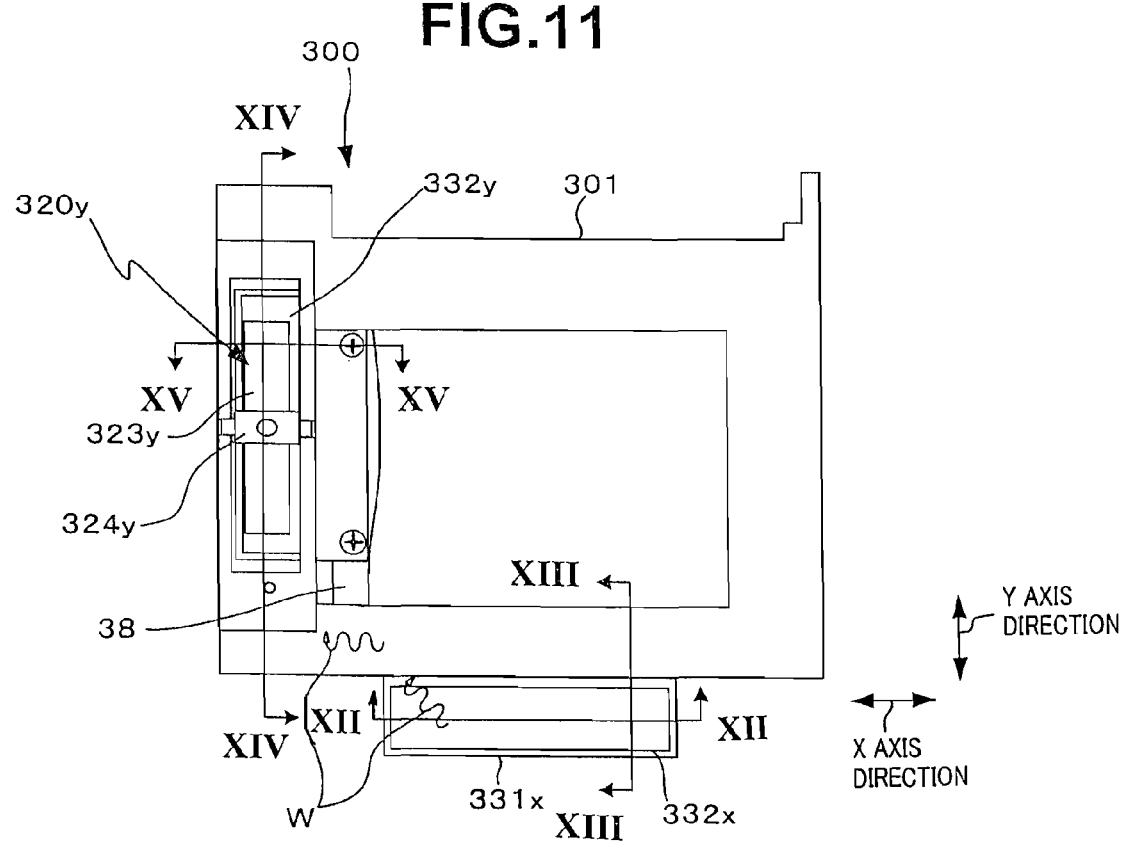
FIG. 11 is a view from a rear side of the photographic optical axis showing shapes of components of the anti-vibration unit of FIG. 5 simplified, showing a state in which vibration of an X-axis transducer is transmitted to a Y-axis transducer side.
Figure 12:
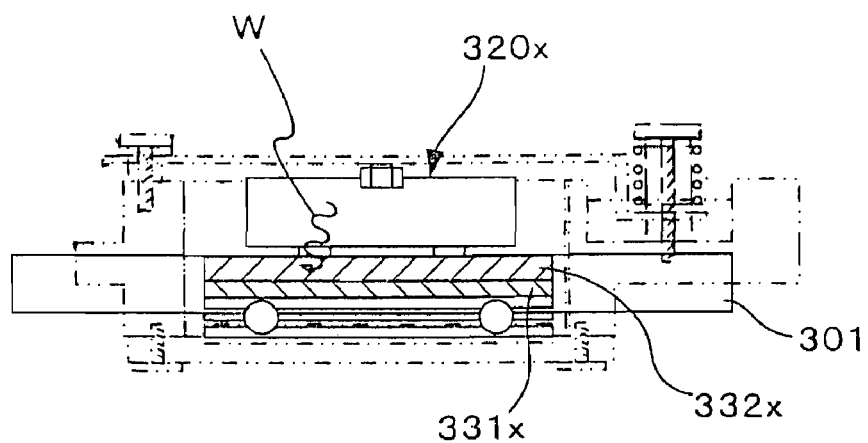
FIG. 12 is a sectional view along XII-XII of FIG. 11.
Figure 13:
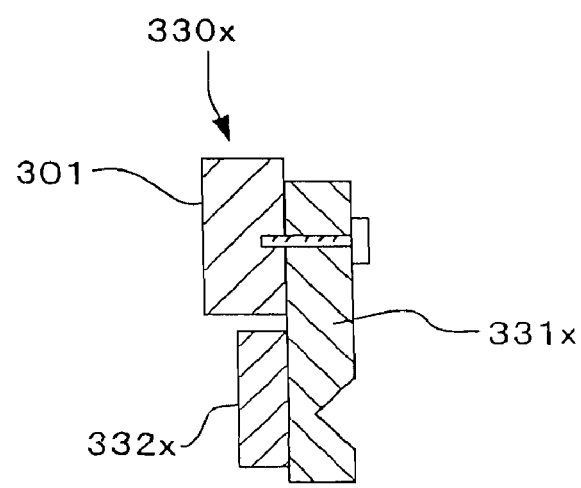
FIG. 13 is a sectional view along XIII-XIII of FIG. 11.
Figure 14:
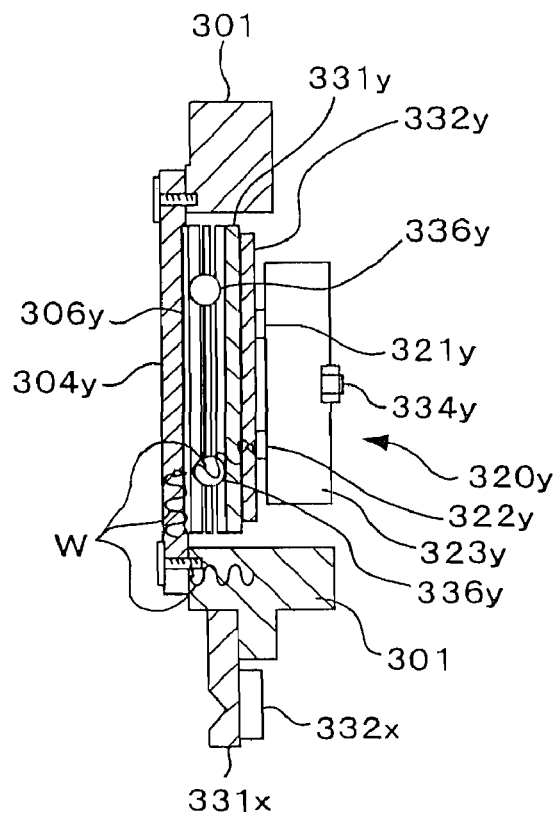
FIG. 14 is a sectional view along XIV-XIV of FIG. 11.
Figure 15:
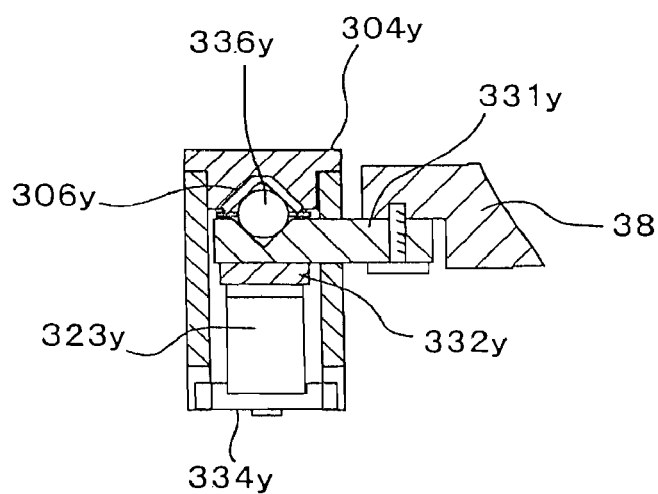
FIG. 15 is a sectional view along XV-XV of FIG. 11.
Figure 16:
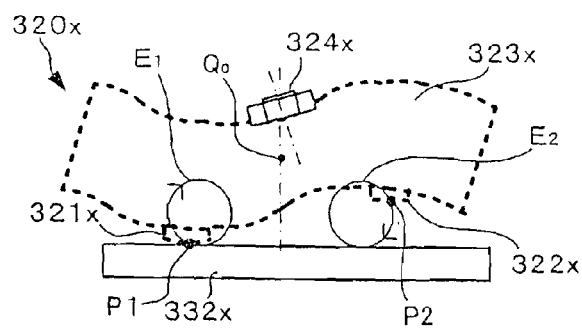
FIG. 16A is a view showing a flexural state among vibrating operation states of the X-axis transducer of an X-axis drive mechanism of the anti-vibration unit of FIG. 5.
FIG. 16B is also a view showing a stretched state subsequent to the state of FIG. 16A among vibrating operation states of the X-axis transducer of the X-axis drive mechanism of the anti-vibration unit of FIG. 5.
FIG. 16C is also a view showing a flexural state subsequent to FIG. 16B among vibrating operation states of the X-axis transducer of the X-axis drive mechanism of the anti-vibration unit of FIG. 5.
FIG. 16D is also a view showing a flexural state subsequent to the state of FIG. 16C among vibrating operation states of the X-axis transducer of the X-axis drive mechanism of the anti-vibration unit of FIG. 5.
FIG. 16E is also a view showing a flexural state subsequent to FIG. 16D among vibrating operation states of the X-axis transducer of the X-axis drive mechanism of the anti-vibration unit of FIG. 5.
FIG. 16F is also a view showing a shrinking state subsequent to the state of FIG. 16E among vibrating operation states of the X-axis transducer of the X-axis drive mechanism of the anti-vibration unit of FIG. 5.
FIG. 16G is also a view showing a flexural state subsequent to FIG. 16F among vibrating operation states of the X-axis transducer of the X-axis drive mechanism of the anti-vibration unit of FIG. 5.
FIG. 16H is also a view showing a flexural state subsequent to FIG. 16G among vibrating operation states of the X-axis transducer of the X-axis drive mechanism of the anti-vibration unit of FIG. 5.
Figure 16:
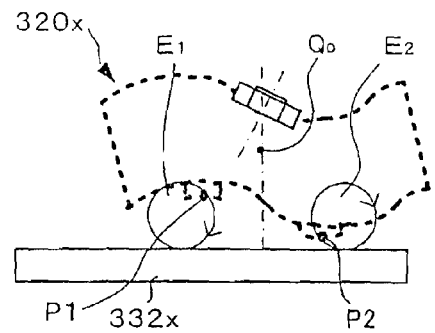
Figure 16:
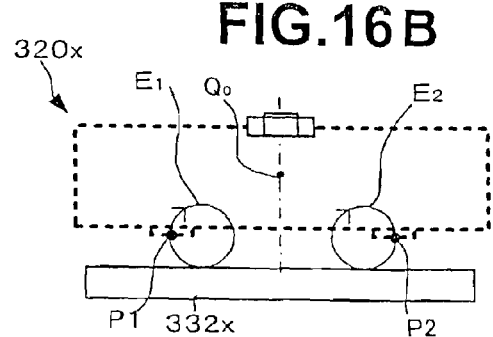
Figure 16:
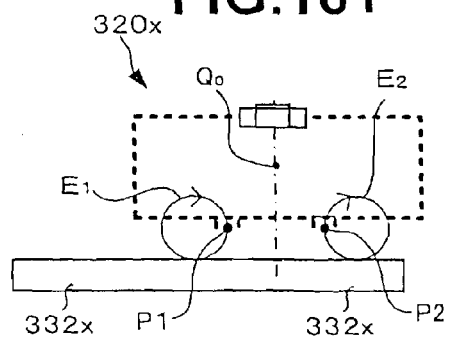
Figure 16:
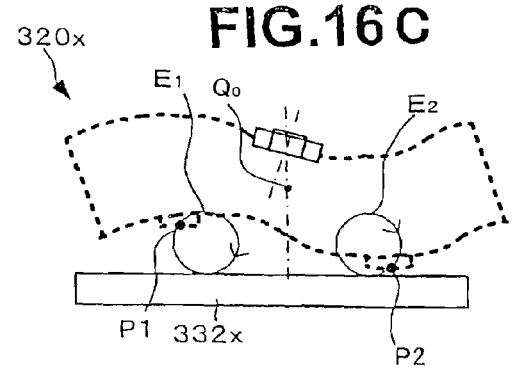
Figure 16:
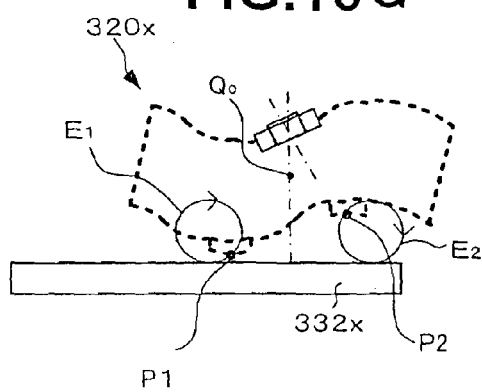
Figure 16:
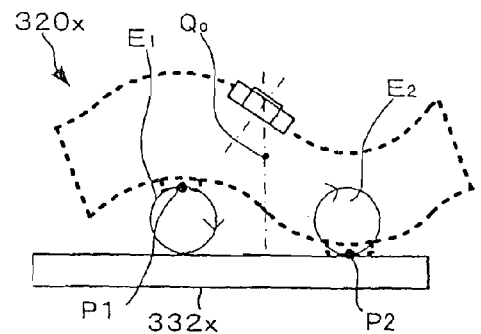
Figure 16:
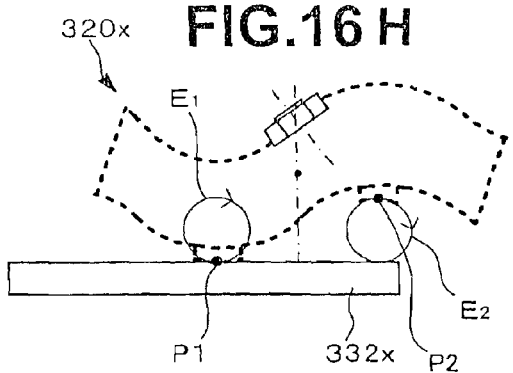

FIGS. 11 to 15 show a state in which vibration of the X-axis transducer is transmitted to the Y-axis transducer side, among which FIG. 11 is a view of the anti-vibration unit from the rear side of the photographic optical axis. FIG. 12 shows a section along XII-XII of FIG. 11, FIG. 13 shows a section along XIII-XIII of FIG. 11, FIG. 14 shows a section along XIV-XIV of FIG. 11 and FIG. 15 shows a section along XV-XV of FIG. 11. FIGS. 16A to 16H are views each showing states of vibrating operation of the X-axis transducer of the X-axis drive mechanism.

When predetermined frequency voltage is applied to the X-axis transducer 320x to generate elliptical vibrations E1, E2 in the drivers 321x, 322x, the slide element 330x is driven in the direction of rotation of elliptical vibration of the drivers 321x, 322x since operating points P1, P2 of the drivers 321x, 322x of the X-axis transducer 320x are in pressure contact with the slide plate 332x by means of strong biasing force of the pressing mechanism 340. For example, the state sequentially varies from FIG. 16A to FIG. 16H and the slide plate 332x contacted by the drivers 321x, 322x making elliptical vibrations E1, E2 moves in the leftward direction in the figures. If the above elliptical vibrations E1, E2 rotate in the reverse directions, of course the slide plate 332x moves in the rightward direction in the figures.

At this time, assuming that the X-axis transducer 320x and the Y-axis transducer 320y have substantially same resonant frequency and the slide elements have same rigidity, as in FIGS. 11 to 15 which are views showing a state in which vibration of the X-axis transducer is transmitted to the Y-axis transducer side, vibration waves W of the X-axis transducer 320x is transmitted through the slide plate (slide portion) 332x, the bearing (guided portion) 331x, the X frame 301, a bearing (guiding portion) 304y, a V-grooved plate 306y, balls 336y, the bearing (guiding portion) 304y, a slide plate (slide portion) 332y to the Y-axis transducer 320y.

Then, resonating with drive vibration of the X-axis transducer 320x, vibration tends to occur in a system including a path of transmission of vibration to absorb drive vibration energy of the X-axis transducer 320x so that operation becomes unstable, operation fails or audible sound is generated resonating with the drive vibration. In addition, when the Y-axis transducer 320y is driven, vibration is transmitted reversely through the above-described path to give rise to similar inconvenience.

However, in the present embodiment, since the slide plate 332x constituting the slide element 330x is configured to be thicker than the slide plate 332y so that the slide element 330x and the slide element 330y have different rigidities, resonant frequency including the above-described system of transmission of vibration can be different from the drive vibration. Therefore, operation of the anti-vibration unit does not become unstable, output is not lowered, and audible sound is not generated by resonance.

For example, when thicknesses of both the slide plate and the bearing are doubled, rigidity of the slide element, being proportional to the third power of thickness, can be increased by 8 times, and then resonant frequency can be doubled. When Young's modulus E is doubled and density ρ is halved by using other material, resonant frequency, being proportional to the square root of Young's modulus/density, can be doubled. When the Y-axis transducer 320y is driven in this case, the X-axis drive mechanism 310x does not resonate so that operation neither becomes unstable nor fails and audible sound is not generated.

In addition, since the slide element 330x and the bearing 331x have high rigidity, the state of pressure contact between the drivers 321x, 322x and the slide plate 332x is stable and driving force by the elliptical vibration is reliably transmitted to the slide plate 332x so that highly efficient driving in the rotational direction of the elliptical vibration is enabled. Here, since the slide element 330x side having the slide plate 332x contacts the frame 302 not by plane contact but by rolling contact by means of the balls 336x at the bearing 331x, 304x portions, the slide element 330x reliably moves with little friction with respect to the frame 302 even when pressing force is strong.

Further, since the bearings 331x, 304x comprises a one line ball bearing structure along the X-axis direction, the slide element 330x moves only in the X-axis direction when driven by the X-axis transducer 320x. When the slide element 330x moves in this way, the X frame 301 to which the slide element 330x is fixed also moves integrally with the slide element 330x in the X-axis direction. That is, the direction of movement of the X-frame 310x is also guided by engagement between the bearings 331x, 304x comprising a one line ball bearing structure along the X-axis direction.

In such operation, while the bearing 331x is rotatable about an axis passing through the centers of the balls 336x and parallel to the V-groove 334x, the bearing 331x is integrated with the X frame 301 and a ball 307x is disposed between the frame 302 and the X frame 301 at a position remote from the bearing 331x in a direction different from the X-axis direction. The X frame 301 (moving element) to which the slide element 330x is fixed is thus supported by three points at spaced positions of the two balls 336x and the one ball 307x with respect to the frame 302 so that it moves stably on the frame 302 in the X-axis direction without being affected by rotation about an axis parallel to the V-groove 334x.

Therefore, a guide support mechanism of a strong depression portion for the X-axis transducer 320x is provided by a one line ball bearing structure along the X-axis direction by the bearings 331x, 304x, thereby enabling miniaturization and simplification of the structure.

The Y-axis drive mechanism 310y operates in a same way as in the case of the X-axis drive mechanism 310x.

Next, shake compensation operation in the camera of the present embodiment will be described.

When an unshown shake compensation SW in the group of camera operating SW 52 has been on and an unshown main SW is switched on, such a signal that a transducer drive circuit 354 performs initial operation is transmitted from the Bμcom 50 to the anti-vibration control circuit 355, predetermined frequency voltage is applied from the transducer drive circuit 354 to the X-axis transducer 320x and the Y-axis transducer 320y, and the X frame 301 and the Y frame 38 are driven in the X-axis direction and the Y-axis direction such that the center of the CCD 31 comes on the photographic optical axis.

Then, shake signals of the body unit 100 detected by the X-axis gyro 350x and the Y-axis gyro 350y are taken in the anti-vibration control circuit 355. Here, signals outputted from an angular velocity sensor detecting shaking about an axis in each of the X-axis gyro 350x and the Y-axis gyro 350y are amplified in a processing circuit and thereafter A/D converted to be inputted to the anti-vibration control circuit 355.

The anti-vibration control circuit 355 calculates a shake compensation amount based on the output signals of the X-axis gyro 350x, the Y-axis gyro 350y and outputs a signal corresponding to the calculated shake compensation amount to the transducer drive circuit 354. The Y frame 38 to which the CCD 31 is mounted and the X frame 301 are driven by the Y-axis transducer 320y and the X-axis transducer 320x which operate by means of electrical signals generated by the transducer drive circuit 354. A drive position of the CCD 31, that is, a drive position of the Y frame 38 is detected by the position detecting sensor 353 and sent to the anti-vibration control circuit 355 to perform feed-back control.

That is, the anti-vibration control circuit 355 calculates a reference value based on inputted signals from the X-axis gyro 350x and the Y-axis gyro 350y (hereinafter also referred to as "shake signal" or "shake angular velocity signal"). Calculation of the reference value is performed from when the main power source of the camera is applied until an exposure is performed for taking a still image. For the calculation, any method may be used such as a method of calculating a moving average of shake signals for a relatively long time and a method of obtaining DC components by a low-pass filter of relatively low cutoff frequency.

By obtaining a difference between the reference value obtained by the calculation and the shake signal, a signal wherein low frequency components of the shake signal are removed is obtained. Then, the transducer drive circuit 354 is controlled based on this signal and the output signal of the position detecting sensor 353 to move the position of the CCD 31, that is, the Y frame 38 so as to compensate for shaking.

Figure 17:
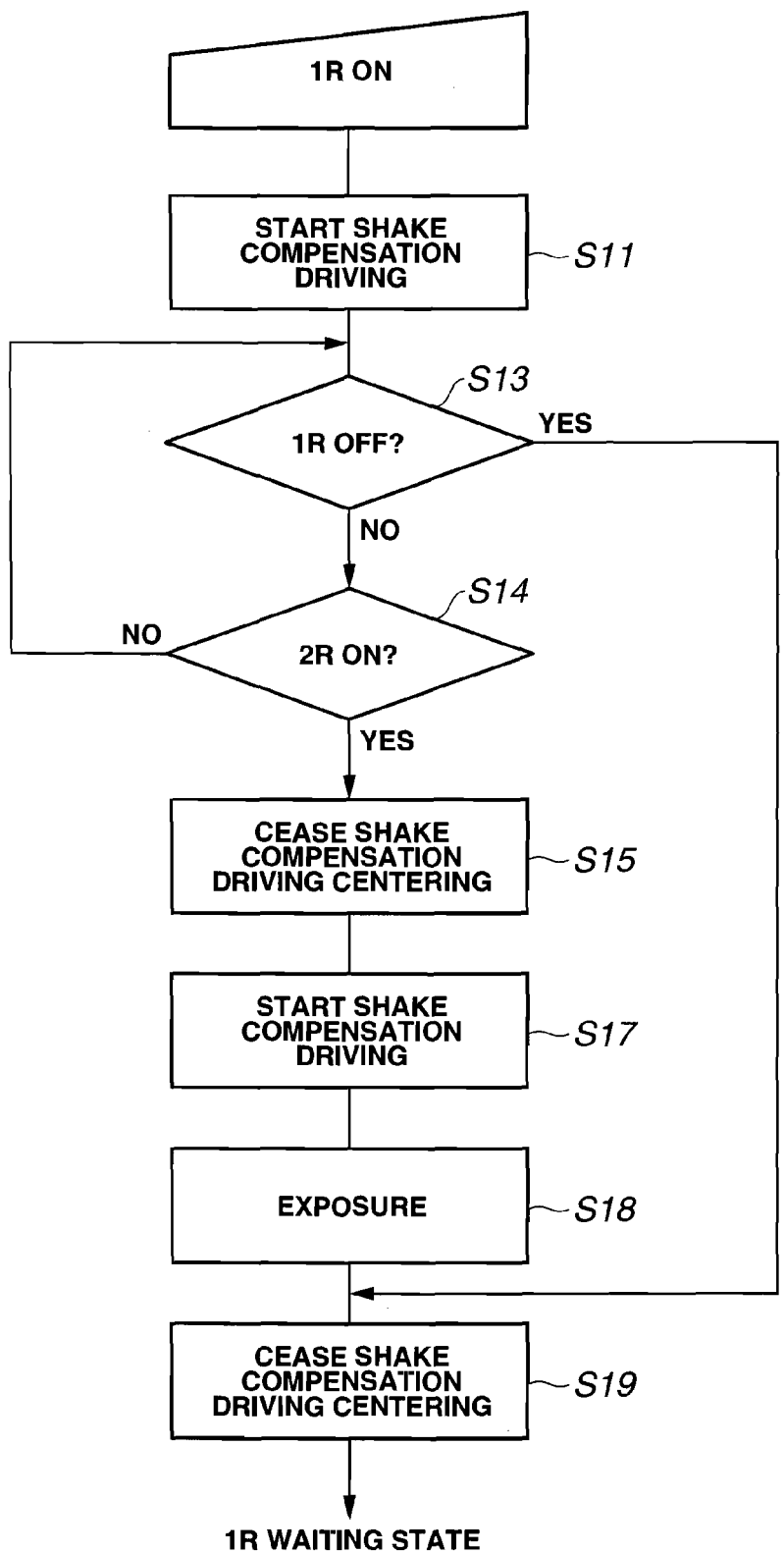
FIG. 17 is a schematic flow chart showing shake compensation operation at a time of taking a still image in the camera of FIG. 1.

Now shake compensation operation at a time of taking a still image in the camera of the present embodiment will be described with reference to FIG. 17. FIG. 17 is a schematic flow chart showing shake compensation operation at a time of taking a still image. The operation is not performed before a photographing preparation start is instructed by the release SW, that is, before 1R ON which is a first stage release operation of the release SW. When 1R ON is operated, that is, when a photographing preparation start is instructed, it is started.

When the operation is started, a compensation amount is calculated using the above-described reference value and shake compensation driving is started in accordance with the calculated compensation amount (step S11). Next, whether the instruction of a photographing preparation start by the release SW is cancelled, that is, whether or not 1R OFF is entered is determined (step S13). If the instruction is cancelled (YES in the determination of step S13), the shake compensation driving started at step S11 is ceased and the CCD 31 is centered (step S19) to return to a state of waiting for an instruction of a photographing preparation start (1R waiting state).

On the other hand, if the instruction of a photographing preparation start by the release SW is not cancelled (NO in the determination of step S13), next whether a start of photographing is instructed by the release SW, that is, whether or not a second stage release operation 2R is ON is determined (step S14). If it is not instructed (NO in the determination of step S14), step returns to S13 to wait in an instruction waiting state. If a start of photographing is instructed by the release SW (YES in the determination of step S14), the shake compensation driving started at step S11 is ceased and the CCD 31 is centered (step S15). Next, a compensation amount is calculated using a reference value retained and shake compensation driving is started in accordance with the compensation amount (step S17). Then an exposure is performed (step S18). When the exposure is completed, the shake compensation driving is ceased and the CCD 31 is centered (step S19) to return to a state of waiting for an instruction of a photographing preparation start (1R waiting state).

As described above, according to a camera of the present embodiment which is an image pickup apparatus containing a drive apparatus, a Y frame holding an image pickup unit can be efficiently driven in a stable state in response to shaking so that more reliable shake compensation can be performed and miniaturization of the camera can also be achieved.

Next, a camera containing an anti-vibration unit (drive apparatus) of a second embodiment will be described using FIGS. 18 to 22.

Figure 18:
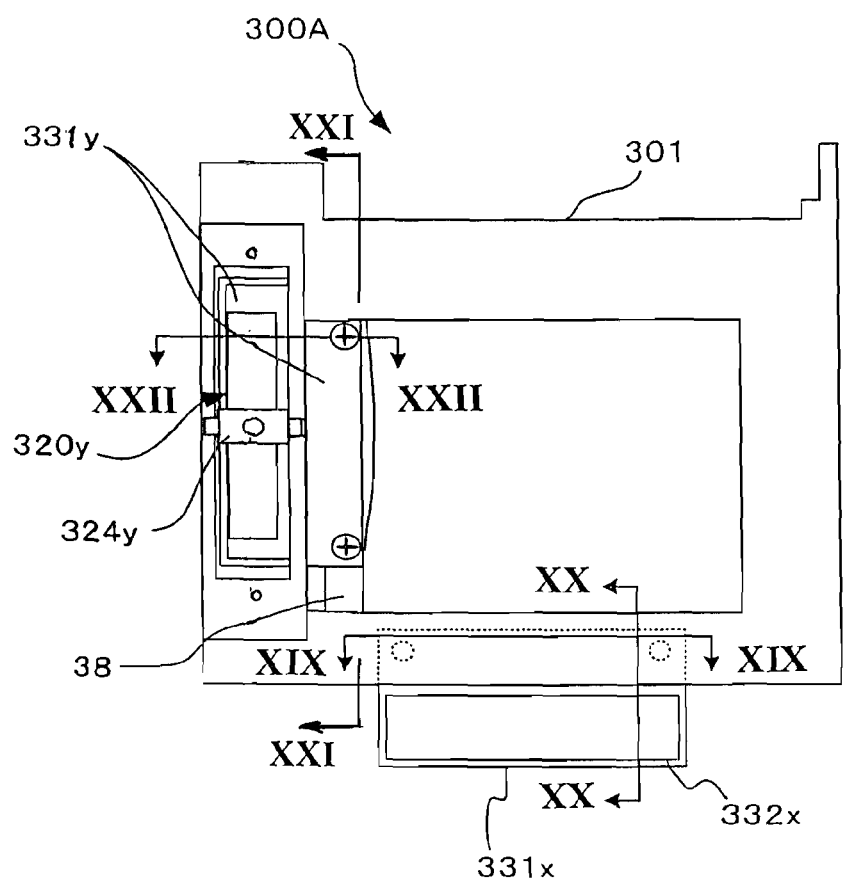
FIG. 18 is a simplified view of an essential part of an anti-vibration unit applied to a camera of a second embodiment of the present invention from the rear side of the photographic optical axis.
Figure 19:
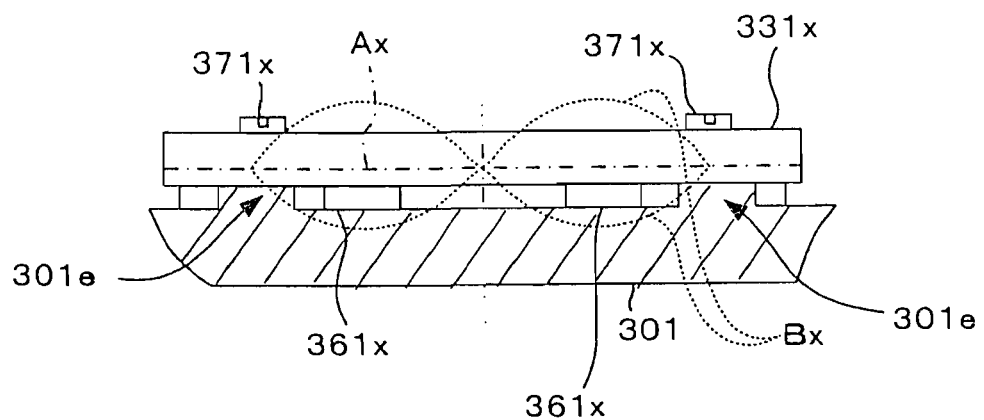
FIG. 19 is a sectional view along XIX-XIX of FIG. 18.
Figure 20:
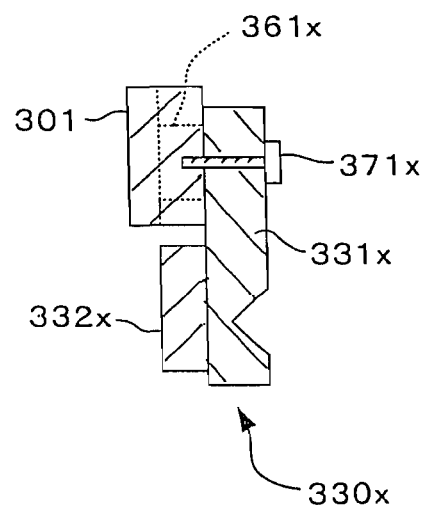
FIG. 20 is a sectional view along XX-XX of FIG. 18.
Figure 21:
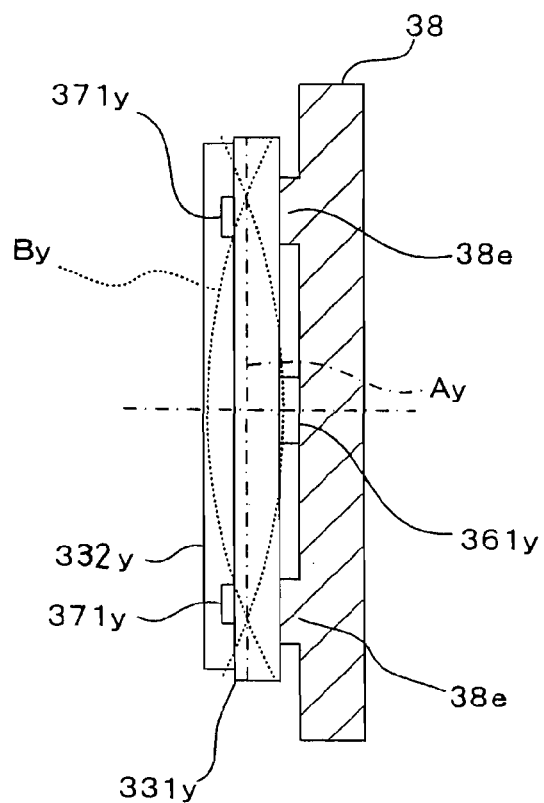
FIG. 21 is a sectional view along XXI-XXI of FIG. 18.
Figure 22:
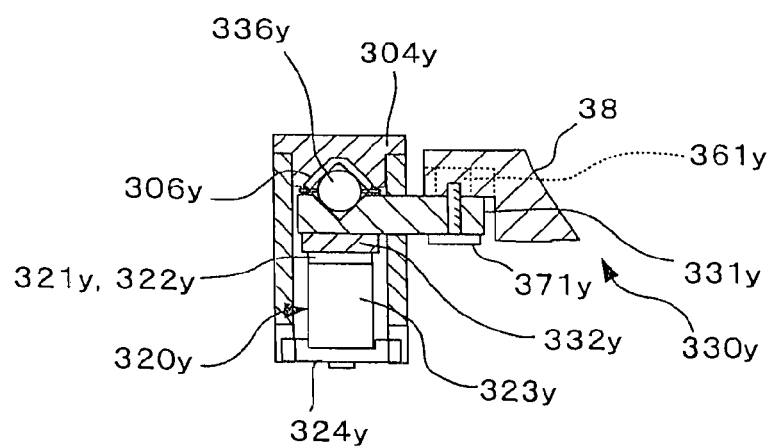
FIG. 22 is a sectional view along XXII-XXII of FIG. 18.

FIG. 18 is a simplified view of an essential part of an anti-vibration unit applied to a camera of the present embodiment from the rear side of the photographic optical axis. FIG. 19 shows a section along XIX-XIX of FIG. 18, FIG. 20 shows a section along XX-XX of FIG. 18, FIG. 21 shows a section along XXI-XXI of FIG. 18 and FIG. 22 shows a section along XXII-XXII of FIG. 18.

The camera of the present embodiment differs from the camera of the above first embodiment in its supporting structure of the slide element of the anti-vibration unit to the frame body, and other configurations are the same. Therefore, same reference numerals are applied to same component members. Different portions will be described below.

In an anti-vibration unit 300A applied to the present embodiment, similarly to the case of the anti-vibration unit 300, the slide plate 332*x* of the slide element 330*x* is bonded to the bearing 331*x*, and the neutral axis of flexure vibration of the slide element 330*x* is as shown in FIG. 19 (a neutral axis Ax at the time of no driving). When the X-axis transducer 320*x* is pressed thereto by the above-described pressing mechanism and drive vibration is generated, a slide element 330*x*A generates flexural vibration to generate a second-order flexural vibration (maximum displacement Bx of the neutral axis at the time of flexural vibration) as shown in FIG. 19. In this state, two spacers 361*x* are sandwiched at positions which are antinodes of vibration of the second-order flexural vibration between two receiving portions 301*e* of the X frame 301.

The spacers 361*x* are sandwiched in a pressed state when the bearing 331*x* is mounted by screws 371*x*.

A rigid body metal, rubber of high hardness or the like can be applied for the spacers 361*x*. If the spacers 361*x* are of metal, pressing force from the screws 371*x* is received by the bearing 331*x* through the spacers 361*x*. On the other hand, if the spacers 361*x* are of rubber of high hardness, pressing force from the screws 371*x* is received by the bearing 331*x* through the spacers 361*x* which are crashed.

By mounting the bearing 331*x* to the X frame 301 with the spacers 361*x* therebetween in this way, a flexural vibration mode deformed from a second-order flexural vibration (a vibration mode close to a fourth-order flexural mode side of doubled vibration frequency) can be obtained and frequency of resonance can be changed so that the slide element 330*x*A does not resonate at drive frequency of the X-axis transducer 320*x*.

Meanwhile, the slide element 330*y* fixed to the Y frame 38, a neutral axis of flexural vibration (a neutral axis Ay at the time of no driving) being shown in FIG. 21, generates a first-order flexural vibration (a maximum displacement By of the neutral axis at the time of flexural vibration) as shown in FIG. 21 when the Y-axis transducer 320*y* is pressed to the slide element 330*y*A and drive vibration is generated including a system of transmission of vibration. A flexural vibration mode deformed from a first-order flexural vibration (a vibration mode close to a second-order flexural mode side) can be obtained by sandwiching a spacer 361*y* at a position of an antinode of the first-order flexural vibration between two receiving portions 38*e* of the Y frame 38 similarly to the transducer 330*x*A, and resonant frequency of the slide element 330*y*A can be changed. Here the spacers 361*x*, 361*y* may be resilient elements such as metal and resin or may be of vibration-absorbing materials such as rubber and felt.

However, if rubber, felt or the like is used, the receiving portions 301*e*, 38*e* need to be formed at slide element mounting portions so as to make amounts of deformation of rubber or felt constant. In the case of metal or resin, for the sake of reliable supporting by the spacers, thickness of the spacers 361*x*, 361*y* is adjusted such that slight gaps are generated when the screws are fastened for the receiving portions 301*e*, 38*e* of FIGS. 19, 21.

According to a camera to which the anti-vibration unit 300A of the present embodiment is applied, in addition to the same effects as in the first embodiment, resonant state of the slide element can be more reliably avoided.

Next, a camera containing an anti-vibration unit (drive apparatus) of a third embodiment will be described.

In the anti-vibration unit in the camera of the present embodiment, shapes of the X-axis transducer 320*x* and the Y-axis transducer 320*y* which generate drive vibration are made different and frequency of drive vibration of both is changed. In this case, the X-axis transducer 320*x* having a large and heavy object to drive is made large in size, and the Y-axis transducer 320*y* having a small and light object to drive is made small in size. With respect to the length L of the transducer shown in FIG. 3B, the resonant frequency of the flexural vibration of the transducer is reversely proportional to the square of the length L.

Therefore, if the length Ly of the Y-axis transducer 320*y* is made shorter than the length Lx of the X-axis transducer 320*x* by, for example, about 30%, the resonant frequency is doubled, which is remarkably effective for preventing resonance.

According to the camera of the present embodiment, the transducers 320*x*, 320*y* generating elliptical vibration which is high in efficiency and likely to provide large driving force are used as the drive source. Meanwhile, moving elements such as the X frame 301 and the Y frame (holder) 38 which are formed in desired size as original objects to be moved have the slide element 330x and the slide element 330y respectively fixed thereto and are configured such that they are prevented from resonating by drive vibration of the respective transducers by respectively changing rigidity, density and manner of fixation to the moving elements of the slide element 330x and the slide element 330y. Thus energy of drive vibration of the transducers is not lost by generation of unnecessary vibration so that efficiency of output of the drive apparatus can be raised. In addition, generation of uncomfortable audible sound can be prevented since unnecessary vibration is not generated.

According to a drive apparatus and an image pickup apparatus according to the present invention, first and second transducers generating elliptical vibration which is high in efficiency and likely to provide large driving force are used as the drive source. Whereas, moving element part comprises a first moving element to which a first moving element portion directly contacted and driven by the first transducer is fixed, and a second moving element to which a second moving element portion is fixed which is held by the first moving element and which operates with the second transducer as the drive source having substantially same resonant frequency as that of the first transducer. Since the first moving element portion and the second moving element portion have different rigidities, when the first or second transducer vibrates for drive, there is no generation of resonant vibration by vibration being transmitted through the first moving element to the other moving element portion and transducer. Therefore, vibration of the transducers is not wasted in unnecessary vibration and a drive apparatus of high output can be provided. In addition, unnecessary audible sound is not generated since unnecessary resonant vibration is not generated.

This invention is not limited to the above embodiments and it is possible that otherwise in a stage of implementation various variations can be implemented within a scope not departing from its spirit. Further, inventions of various stages are included in the above embodiments and various inventions can be extracted by appropriate combination in a plurality of constituent requirements disclosed.

What is claimed is:

1. A drive apparatus including:
   a first transducer which generates elliptical vibration in a drive portion by application of predetermined frequency voltage thereto;
   a fixing member having a first holding portion for holding the first transducer;
   a first moving element having fixed thereto a first moving element portion to which the drive portion of the first transducer is pressed, a direction of movement of which is restricted to a first direction by a guiding portion of the fixing member, and which is driven by elliptical vibration of the first transducer to move in the first direction with respect to the fixing member;
   a second transducer which is held by a second holding portion provided in the first moving element and which generates elliptical vibration in a drive portion by application of predetermined frequency voltage thereto; and
   a second moving element having fixed thereto a second moving element portion to which the drive portion of the second transducer is pressed, a direction of movement of which is restricted to a second direction different from the first direction by a guiding portion of the first moving element, and which is driven by elliptical vibration of the second transducer to move in the second direction with respect to the first moving element; wherein
   the first transducer and the second transducer have substantially same resonant frequency and the first moving element portion and the second moving element portion differ in at least one of rigidity and density thereof.

2. The drive apparatus according to claim 1, wherein the first moving element portion and the second moving element portion have different moduli of elasticity.

3. The drive apparatus according to claim 1, wherein the first moving element portion and the second moving element portion have different second moments of area.

4. A drive apparatus including:
   a first transducer which generates elliptical vibration in a drive portion by application of predetermined frequency voltage thereto;
   a fixing member having a first holding portion for holding the first transducer;
   a first moving element having fixed thereto a first moving element portion to which the drive portion of the first transducer is pressed, a direction of movement of which is restricted to a first direction by a guiding portion of the fixing member, and which is driven by elliptical vibration of the first transducer to move in the first direction with respect to the fixing member;
   a second transducer which is held by a second holding portion provided in the first moving element and which generates elliptical vibration in a drive portion by application of predetermined frequency voltage thereto; and
   a second moving element having fixed thereto a second moving element portion to which the drive portion of the second transducer is pressed, a direction of movement of which is restricted to a second direction different from the first direction by a guiding portion of the first moving element, and which is driven by elliptical vibration of the second transducer to move in the second direction with respect to the first moving element; wherein
   the first transducer and the second transducer have substantially same resonant frequency, and the first moving element portion and the second moving element portion differ in their manner of fixation to the first moving element and the second moving element.

5. The drive apparatus according to claim 4, wherein flexural vibration states of the first moving element portion and the second moving element portion are different by means of manners of fixation of the first moving element portion and the second moving element portion.

6. A drive apparatus including:
   a first transducer which generates elliptical vibration in a drive portion by application of predetermined frequency voltage thereto;
   a fixing member having a first holding portion for holding the first transducer;
   a first moving element having fixed thereto a first moving element portion to which the drive portion of the first transducer is pressed, a direction of movement of which is restricted to a first direction by a guiding portion of the fixing member, and which is driven by elliptical vibration of the first transducer to move in the first direction with respect to the fixing member;
   a second transducer which is held by a second holding portion provided in the first moving element and which generates elliptical vibration in a drive portion by application of predetermined frequency voltage thereto; and
   a second moving element having fixed thereto a second moving element portion to which the drive portion of the second transducer is pressed, a direction of movement of which is restricted to a second direction different from the first direction by a guiding portion of the first moving element, and which is driven by elliptical vibration of the second transducer to move in the second direction with respect to the first moving element; wherein the first transducer and the second transducer have different resonant frequencies.

* * * * *